(12) United States Patent
St-Laurent et al.

(10) Patent No.: US 11,245,488 B2
(45) Date of Patent: Feb. 8, 2022

(54) FAST TRANSIENT SUPPRESSOR FOR OPTICAL TRANSMISSION SYSTEMS

(71) Applicant: Infinera Corp., Annapolis Junction, MD (US)

(72) Inventors: Stephane St-Laurent, Roxboro (CA); Jonathan Michael Buset, San Jose, CA (US); Biao Lu, Saratoga, CA (US); Steve Sanders, Los Altos, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 16/853,498

(22) Filed: Apr. 20, 2020

(65) Prior Publication Data

US 2020/0336238 A1 Oct. 22, 2020

Related U.S. Application Data

(60) Provisional application No. 62/836,425, filed on Apr. 19, 2019.

(51) Int. Cl.
*G02F 1/00* (2006.01)
*G02F 2/00* (2006.01)
(Continued)

(52) U.S. Cl.
CPC .......... *H04J 14/0212* (2013.01); *G02F 1/313* (2013.01); *H01S 3/06716* (2013.01); *H01S 3/1305* (2013.01); *H01S 3/1608* (2013.01); *H01S 3/2391* (2013.01); *H04B 10/03* (2013.01); *H04B 10/07955* (2013.01); *H04Q 11/0062* (2013.01); *H01S 2301/02* (2013.01); *H04Q 2011/0081* (2013.01)

(58) Field of Classification Search
CPC ....................... H04J 14/0212; H04B 10/07955
See application file for complete search history.

(56) References Cited

U.S. PATENT DOCUMENTS 10,547,404 B1 * 1/2020 Al Sayeed ........... H04B 10/071
10,826,641 B1 * 11/2020 Al Sayeed .......... H04J 14/0261
(Continued)

OTHER PUBLICATIONS

Infinera, "1X4 ROADM/100 GHz", Jun. 7, 2016, Infinera, All pages (Year: 2016).*

*Primary Examiner* — David C Payne
*Assistant Examiner* — Pranesh K Barua
(74) *Attorney, Agent, or Firm* — David L. Soltz

(57) ABSTRACT

An apparatus is described. The apparatus comprises a downstream wavelength selective switch having an input port, an optical path operable to carry an optical signal, an optical source providing amplified spontaneous emission (ASE) light, an optical switch having a first input coupled to the optical path, a second input coupled to the optical source and receiving the ASE light, and an output coupled to the input port of the downstream wavelength selective switch. The optical switch couples either the first input or the second input to the output. Further included is a photodiode operable to monitor the optical signal, detect an optical loss of signal of the optical signal, and output a switch signal to the optical switch such that the optical switch couples the second input receiving the ASE light to the output whereby the ASE light is directed to the input port of the downstream wavelength selective switch.

16 Claims, 8 Drawing Sheets

(51) Int. Cl.
*H01S 3/00* (2006.01)
*H04B 10/00* (2013.01)
*H04J 14/00* (2006.01)
*H04J 14/02* (2006.01)
*H04B 10/03* (2013.01)
*H04Q 11/00* (2006.01)
*H04B 10/079* (2013.01)
*H01S 3/067* (2006.01)
*H01S 3/13* (2006.01)
*H01S 3/23* (2006.01)
*G02F 1/313* (2006.01)
*H01S 3/16* (2006.01)

(56) References Cited

U.S. PATENT DOCUMENTS

| | | | |
|---|---|---|---|
| 2014/0286635 A1* | 9/2014 | Kaneko | H04B 10/564 398/34 |
| 2016/0173202 A1* | 6/2016 | Kelly | H04B 10/564 398/34 |
| 2018/0212707 A1* | 7/2018 | Yamamoto | H04Q 11/0005 |
| 2018/0269964 A1* | 9/2018 | Mertz | G02B 6/43 |
| 2019/0052356 A1* | 2/2019 | Inoue | H04B 10/077 |
| 2019/0296851 A1* | 9/2019 | Jiang | H04B 10/07953 |
| 2020/0076499 A1* | 3/2020 | Al Sayeed | H04B 10/0791 |
| 2020/0076501 A1* | 3/2020 | Searcy | H04B 10/0731 |
| 2020/0313380 A1* | 10/2020 | Pei | H01S 3/0677 |

\* cited by examiner

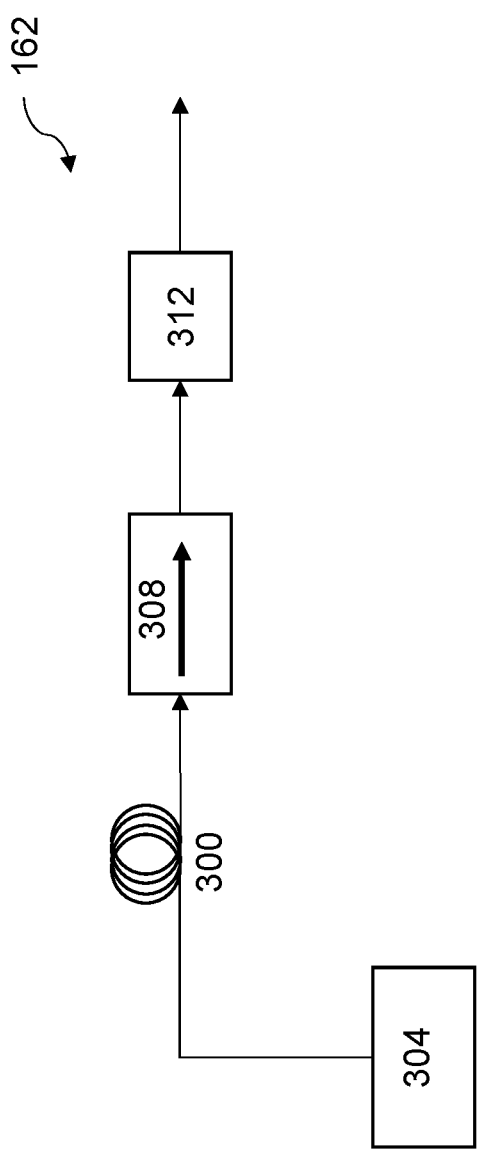

FAST TRANSIENT SUPPRESSOR FOR OPTICAL TRANSMISSION SYSTEMS

INCORPORATION BY REFERENCE

The present patent application claims priority to the provisional patent application identified by U.S. Ser. No. 62/836,425, filed on Apr. 19, 2019, the entire content of which is hereby incorporated herein by reference.

BACKGROUND

Optical networking is a communication means that utilizes signals encoded in light to transmit information in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wave division multiplexing to enable high-bandwidth, trans-continental communication.

Optical networks include both free-space optical networks and fiber optic networks. Free-space networks transmit signals across open space without the use of a specific medium for the light. An example of a free-space optical network includes Starlink by SpaceX. A fiber-optic network, however, utilizes fiber optic cables made of glass fiber to carry the light through a network.

The signal traversing the fiber optic cable (optical signal) carries one or more data channels within an optical signal wavelength. If a channel fails or experiences an optical loss of signal (OLOS), that is, if a portion of the optical signal wavelength having a channel has an unexpected power loss, a power transient may be formed that is amplified based on the number of line spans between terminals. The power transient may cause one or more of the channels on the optical signal to become unreadable or may prevent the optical signal from carrying all data to an end terminal. Further, the power transient may lead to signal degradation that cannot be corrected, thereby causing other existing channels to fail to maintain the signal until the next power control cycle, which may be hundreds of seconds later.

Additionally, optical networks carrying traffic across both C and L band spectra may be susceptible to large transient changes in spectral shape due to large stimulated Raman scattering (SRS) that transfers power from shorter to longer wavelengths during transmission in an optical fiber span. Such transients can result in loss of traffic on surviving channels in the event of the loss of upstream wavelengths. Previous disclosures to quickly recover a link after traffic loss include setting amplifier tilt and gain to pre-calculated levels that account for the loss of traffic as described in U.S. Patent Application No. 62/760,074 titled "A Method and Apparatus for Rapid Recovery of Optical Power after Transient Events in C+L Band Optical Networks", hereby incorporated by reference in its entirety. The previous disclosure may partially reoptimize the link in several seconds. However, in applications that require full optical protection, it is expected that traffic outages will be limited to less than 50 msec.

Thus, a need exists for a transient suppressor to maintain optical channel loading and suppressing power transients associated with loss of traffic. It is to such a system and method that the present disclosure is directed.

SUMMARY

The problem of maintaining operational media channels of an optical signal in the event that one or more media channels fail, is addressed by an apparatus herein described. The apparatus comprises a downstream wavelength selective switch having an input port, an optical path operable to carry an optical signal, an optical source providing amplified spontaneous emission (ASE) light, an optical switch having a first input coupled to the optical path, a second input coupled to the optical source and receiving the ASE light, and an output coupled to the input port of the downstream wavelength selective switch. The optical switch couples either the first input or the second input to the output. Further included is a photodiode operable to monitor the optical signal, detect an optical loss of signal of the optical signal, and output a switch signal to the optical switch such that the optical switch couples the second input receiving the ASE light to the output whereby the ASE light is directed to the input port of the downstream wavelength selective switch.

BRIEF DESCRIPTION OF SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 8 is a block diagram of an exemplary ASE light source.

DETAILED DESCRIPTION

Figure 1:
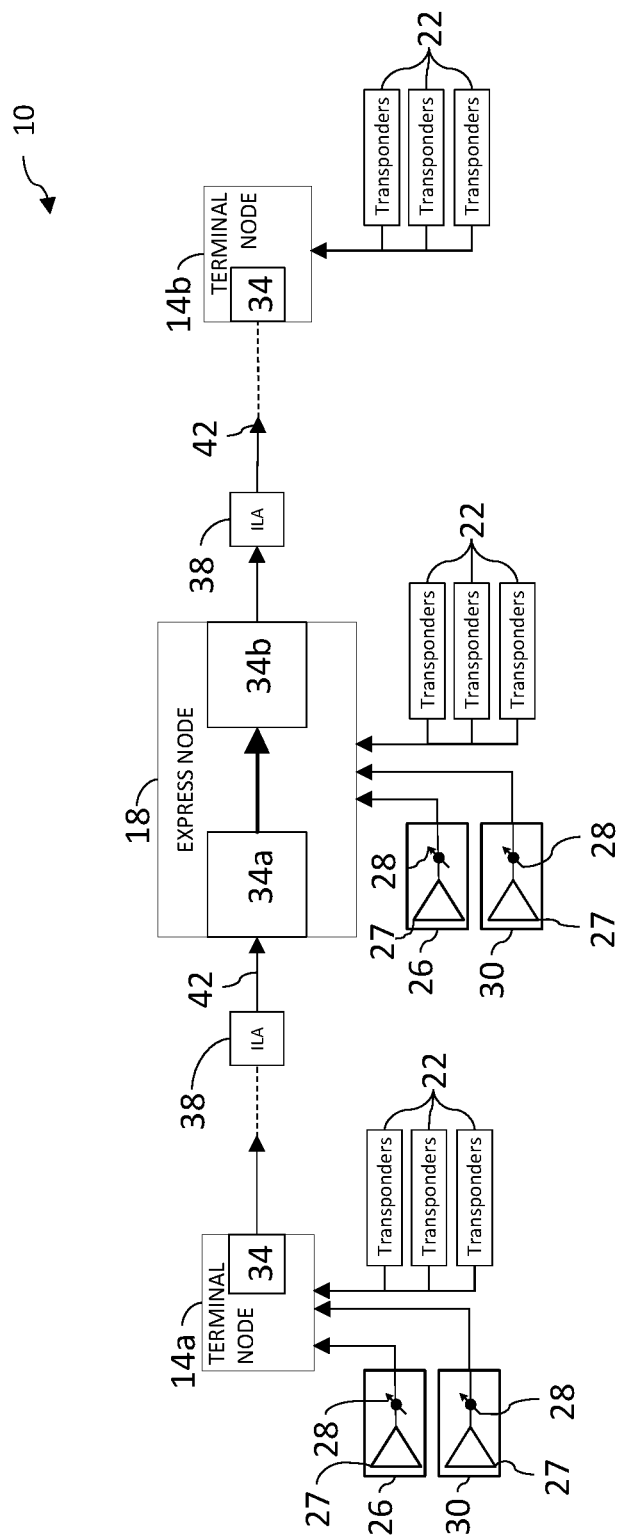
FIG. 1 is a schematic diagram of an exemplary embodiment of an optical network constructed in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

A reconfigurable add-drop multiplexer (ROADM) node is an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar light-wave circuit (PLC), and wavelength selective switching (WSS)—though the WSS has become the dominant technology. A ROADM system is a metro/regional WDM or long-haul DWDM system that includes a ROADM node. ROADMs are often talked about in terms of degrees of switching, ranging from a minimum of one degree (e.g., a terminal node) to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

The methods and systems herein disclosed may be used in optical networks. In one embodiment, the optical network has one or more band, or portion of wavelength. As used herein, the C-Band is a first band of light having a wavelength between about 1525 nm and 1565 nm. The L-Band is a second band of light having a wavelength between about 1565 nm and 1625 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

As used herein, a span is the spread or extent of a fiber optic cable between the fiber optic cables' terminals. Generally, a span is an unbroken or uninterrupted segment of fiber optic cable between amplifiers. For instance, if a fiber optic cable carried a signal from point A through a repeater or amplifier at point B and on to point C, the fiber optic cable is said to have two spans, a first span from A to B, and a second span from B to C, the length of the spans being the distance between the respective points. A span may also be the distance between amplifiers, even if the fiber optic cable has not been terminated. For example, the fiber optic cable may not be terminated at an optical in-line amplifier (described in detail below).

As used herein, a transmission line segment is the portion of a transmission line from a first node (e.g., ROADM) transmitting an optical signal to a second node (e.g., ROADM) receiving the optical signal. The transmission line segment may include one or more optical in-line amplifier situated between the first node and the second node as well as one or more express nodes situated between the first node and the second node. The transmission line may be a fiber optic cable optically coupling the first node and the second node.

Amplified spontaneous emission (ASE) is light produced by spontaneous emission that has been optically amplified by the process of stimulated emission in a gain medium. ASE is an incoherent effect of pumping a laser gain medium to produce an optical signal. If an amplified spontaneous emission power level is too high relative to the optical signal power level, the optical signal in the fiber optic cable will be unreadable due to the low signal to noise ratio.

Raman scattering, also known as spontaneous Raman scattering, is an inelastic scattering of photons by matter, that is, the direction and energy of the light changes due to an exchange of energy between photons and the medium. Inelastic scattering is a fundamental scattering process in which the kinetic energy of an incident particle is not conserved. Stimulated Raman scattering (SRS) takes place when a signal light interacts in a medium with a pump light (light source or original light), which increases the Raman-scattering rate beyond spontaneous Raman scattering. Signal-Signal Stimulated Raman Scattering is Raman scattering caused by the injection of two or more signal lights into a light stream. Raman gain, also known as Raman amplification, is based on stimulated Raman scattering wherein a lower frequency photon induces the inelastic scattering of a higher-frequency photon in an optical medium.

As used herein, gain is a process wherein the medium on which an optical signal is traveling transfers part of its energy to the emitted signal, in this case the optical signal, thereby resulting in an increase in optical power. In other words, gain is a type of amplification of the optical signal.

As used herein, tilt, also called linear power tilt, is defined as the linear change in power with wavelength over the signal spectrum. Due to Raman gain, short wavelength signals provide Raman gain for longer wavelengths. SRS Tilt strength, that is the difference in gain between the longest wavelength and the shortest wavelength of the signals, depends on the optical signal power, spectral loading, fiber type, and fiber length. As used herein, the tilt arises from power that is depleted from shorter wavelength signals to amplify longer wavelength signals. Optical networks carrying both C and L band traffic are especially susceptible to changes in spectral loading, since such optical networks have a large optical bandwidth and high optical powers that result in large SRS tilts, typically up to 6 dB per span. The loss of traffic in any span can change that span's SRS tilt by several dB, which will increase the nonlinearity for channels that gain power and reduce optical signal to noise ratio for channels that lose power.

Spectral loading, or channel loading, is the addition of one or more channel to a specific spectrum of light described by the light's wavelength in an optical signal. When all channels within a specific spectrum are being utilized, the specific spectrum is described as fully loaded. A grouping of one or more channels may be called a media channel. Spectral loading may also be described as the addition of one or more media channel to a specific spectrum of light described by the light's wavelength to be supplied onto the optical fiber as the optical signal.

Line amplifier dynamics (i.e., EDFA, Raman) and interactions in optical fiber (Signal-Signal Raman gain, etc.) are likely to change based on spectral loading changes (such as number of optical channels in the fiber optic cable and/or the wavelength of the present optical channels, etc.) In other words, amplifier and optical fiber dynamics differ when the wavelength of the optical signals, or optical carriers, for existing optical channels change and this causes changes in the tilt.

The present disclosure provides a system that describes how to automatically replace the predetermined groups of channels with ASE light at an express node to minimize any change to the data transmission of existing data carrying channels, in the event of a failure of predetermined groups of channels within the optical signal. This way signal loading changes are automatically handled such that the fiber's spectral loading is reverted back to optimal and/or minimally affected. Furthermore, herein disclosed is a system and method to rapidly replace lost signal in an express path and suppress SRS tilt changes that occur upon loss of upstream traffic.

Figure 7:
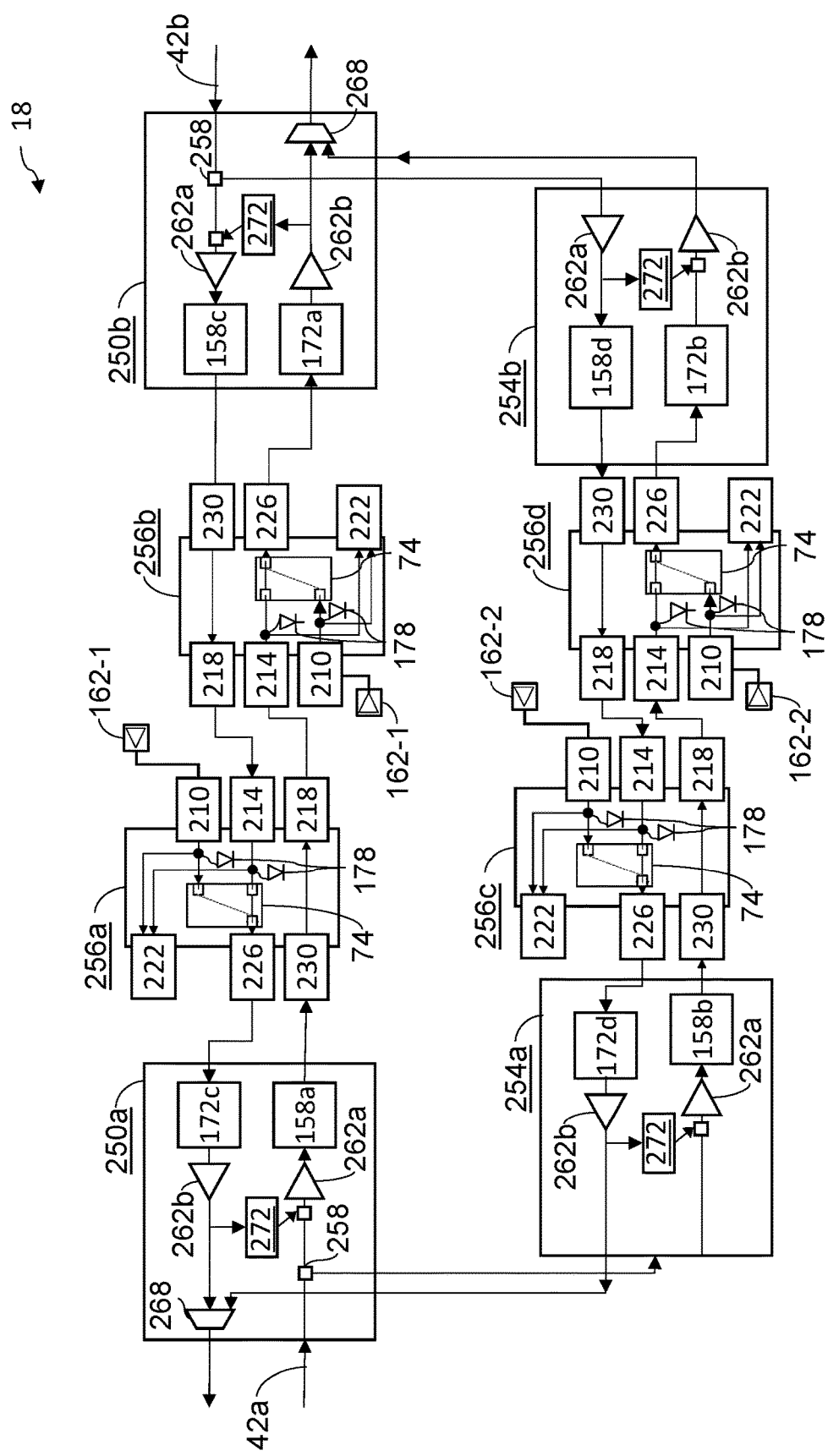
FIG. 7 is a schematic diagram of an exemplary embodiment of an express node using the third express ASE card of FIG. 6 and constructed in accordance with the present disclosure.

Referring now to the drawings, and in particular to FIG. 1, shown therein is an exemplary embodiment of an optical network 10 having at least a first terminal node 14a as a head-end node, a second terminal node 14b as a tail-end node, and an express node 18, each with one or more transponder 22, a C-Band ASE light source 26 (which may be referred to herein as an optical source) having at least a laser 27 and a variable optical attenuator 28, and an L-Band ASE light source 30 (which may be referred to herein as an optical source) having at least a laser 27 and a variable optical attenuator 28, and one or more degree 34. In one embodiment, the optical network 10 further includes one or more in-line amplifier node (ILA) 38. Each degree 34 may contain one or more ROADM, such as a C-Band ROADM 250 (as shown in FIG. 7 and described in more detail below) and an L-Band ROADM 254 (as shown in FIG. 7 and described in more detail below), and each transponder 22 may include one or more transponder such as a C-Band transponder and an L-Band transponder. Each of the one or more transponders 22 causes light to be transmitted at one or more distinct wavelength band and/or channel. Each node, such as the first terminal node 14a, the second terminal node 14b, the express node 18, and the ILA 38, are connected to at least one other node via a fiber optic cable 42. In one embodiment, the optical network 10 is an optical mesh network.

In one embodiment, the fiber optic cable 42 may form a path enabling an optical signal to pass through one or more span, one or more amplifier, and/or one or more ROADM. FIG. 1 depicts only one express node 18 for brevity. It is to be understood that one or more express nodes may be intermediate to the first terminal node 14a and the second terminal node 14b. Similarly, FIG. 1 depicts only one ILA 38 intermediate each terminal node 14 and the express node 18; it is to be understood that one or more ILA 38 may be intermediate to the first terminal node 14a and the express node 18 and may be intermediate to the express node 18 and the second terminal node 14b. FIG. 1 depicts only one optical signal direction for brevity, however, it is to be understood that an optical signal may travel in more than one direction within the optical network 10.

Figure 2:
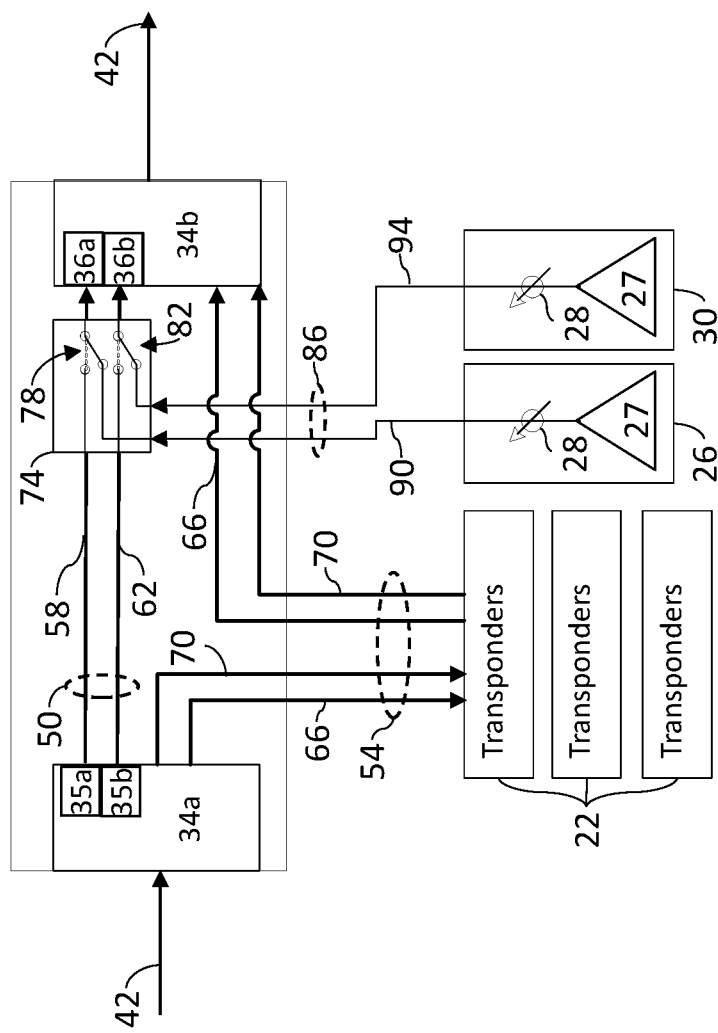
FIG. 2 is a block diagram of an exemplary embodiment of an express node constructed in accordance with the present disclosure.

Referring now to FIG. 2, shown therein is an exemplary embodiment of the express node 18 of FIG. 1 having an express path 50 and a transponder path 54, each path formed at least in part by a waveguide. The express path 50 may include a C-Band express path 58 and an L-Band express path 62. Similarly, the transponder path 54 may include a C-Band transponder path 66 and an L-Band Transponder path 70. The express path 50 optically connects the fiber optic cable 42 connected to a first degree 34a to a second degree 34b without interfacing with the one or more transponder 22. The express node 18 further includes one or more express optical switch 74 having at least a C-Band switch 78 and/or an L-Band switch 82. The express optical switch 74 is configured to switch between the express path 50 and an ASE Idler path 86 having at least a C-Band ASE idler path 90 connected to the C-Band ASE light source 26 and/or an L-Band ASE idler path 94 connected to the L-Band ASE light source 30. The express optical switch 74 further includes a first input 75a, a second input 75b, and an output 76 as described below and shown in more detail in FIG. 5.

In one embodiment, the first degree 34a includes a C-Band express output port 35a enabling an optical connection between the first degree 34a and the C-Band express path 58 and an L-Band express output port 35b enabling an optical connection between the first degree 34a and the L-Band express path 62. Similarly, the second degree 34b includes a C-Band express input port 36a enabling an optical connection between the second degree 34b and the C-Band switch 78 and an L-Band express input port 36b enabling an optical connection between the second degree 34b and the L-Band switch 82.

In one embodiment, the C-Band switch 78 may be configured to switch from the C-Band express path 58 to the C-Band ASE idler path 90 to enable the C-Band ASE light source 26 to supply power to the C-Band express input ports. Similarly, the L-Band switch 82 may be configured to switch from the L-Band express path 62 to the L-Band ASE idler path 94 to enable the L-Band ASE light source 30 to supply power to the L-Band express input ports.

Figure 3:
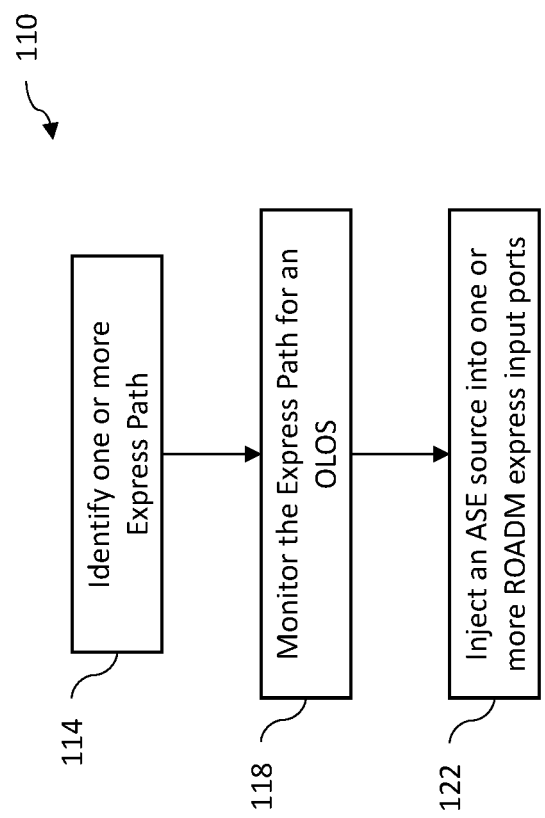
FIG. 3 is a process flow diagram of an exemplary embodiment of an express node OLOS compensation process in accordance with the present disclosure.

Referring now to FIG. 3, shown therein is a process flow diagram of an express node optical loss of signal (OLOS) compensation process 110 generally comprising the steps of: identify one or more Express path (step 114); detect an optical loss of signal in the express path (step 118); and inject the ASE sources into the ROADM express input ports (step 122).

Identifying one or more Express path (step 114) may include identifying a path through a node wherein the optical signal passes through the node without communicating with the one or more transponder 22, such as the express path 50 shown in FIG. 2.

Detecting an optical loss of signal in the express path (step 118) may include measuring, by one or more photodiode, a power of the express path 50, the C-Band express path 58, and/or the L-Band express path 62. In one embodiment, the power may be compared to a power threshold to determine whether the optical signal on the express path 50 has failed. The power threshold may be configurable, that is, a user may determine and/or set the power threshold. In one embodiment, the one or more photodiode is in communication with an optical channel monitor (OCM) as described below. In one embodiment, detecting an optical loss of signal in the express path (step 118) may further include monitoring the express path for incoming traffic at each express input port, creating a shaped ASE to match the incoming spectrum upon an optical loss of signal, and detecting an optical loss of signal.

In one embodiment, injecting light from the ASE source(s) into the ROADM express input port(s) (step 122) may be performed by toggling the express optical switch 74 to connect the ASE idler path to the express input ports. By injecting light from the ASE source into an optical signal to replace lost traffic, the optical loading of an optical signal may be recovered. In one embodiment, step 122, injecting light from the ASE source into the ROADM express input port, may occur less than 50 ms after step 118, detecting an optical loss of signal in the express path. In another embodiment, step 122 may occur less than 10 ms after step 118.

Alternative configurations of an express ASE card implementing the express node OLOS compensation process 110 are described below as, for example, a first express ASE card 150-1 in FIG. 4, a second express ASE card 150-1 in FIG. 5, and a third express ASE card 150-1 in FIG. 6.

Figure 4:
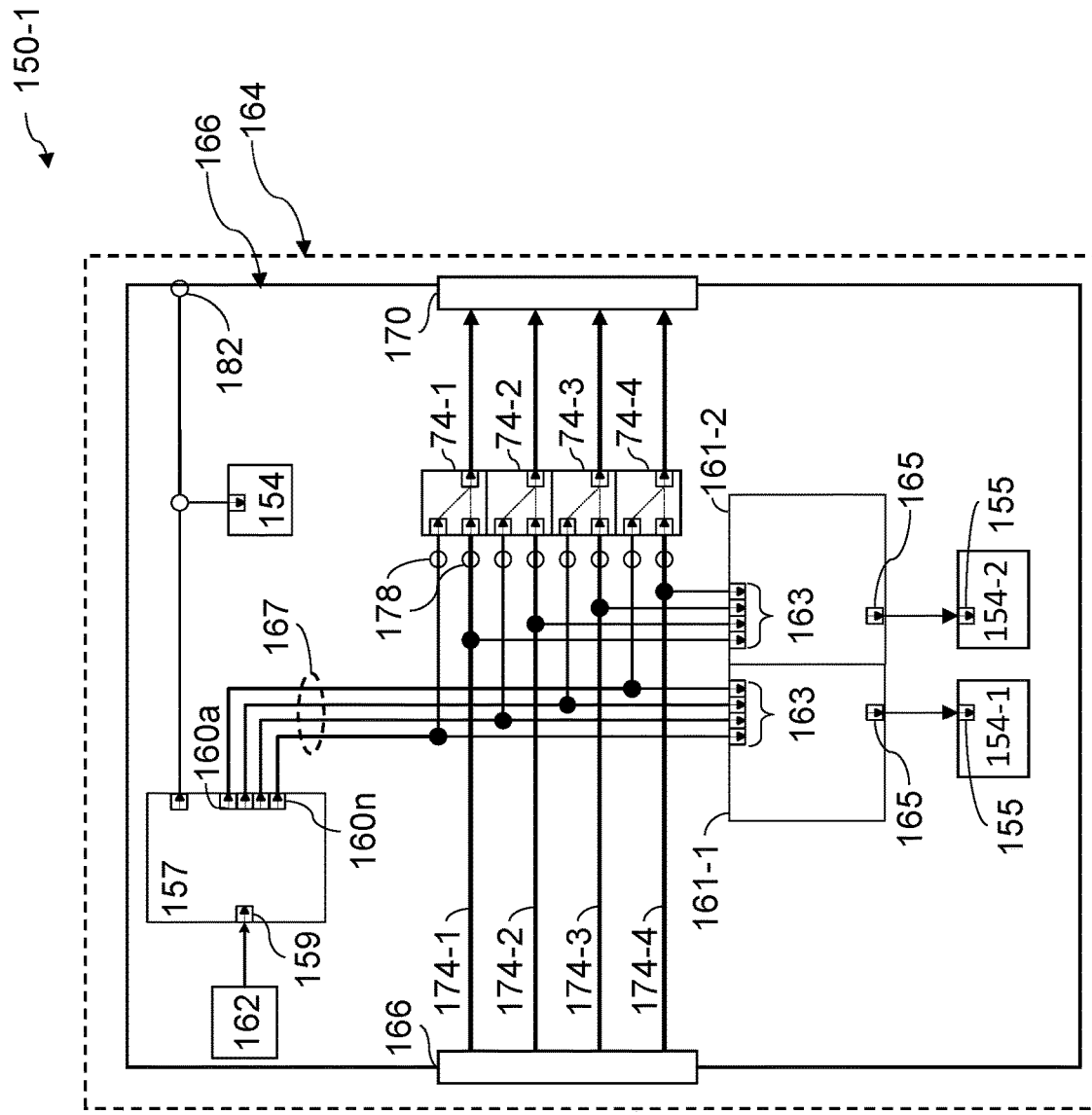
FIG. 4 is a block diagram of an exemplary embodiment of a first express ASE card with integrated optical channel monitors and a pre-shaping ASE WSS constructed in accordance with the present disclosure.

Referring now to FIG. 4, shown therein is an exemplary embodiment of a diagram of the first express ASE card 150-1 having a plurality of OCMs 154 (labeled in FIG. 4 with the reference numerals 154-1 and 154-2), an ASE wavelength selective switch (ASE WSS) 157 with an input port 159 and a plurality of output ports 160a-n, an ASE source 162 (which may be referred to herein as an optical source) providing ASE light along one or more waveguides 167 (e.g. ASE path), a plurality of express optical switches 74 (labeled in FIG. 4 as 74-1, 74-2, 74-3 and 74-4) each corresponding to a degree, a first MPO connector 166 and a second MPO connector 170. The first express ASE card 150-1 may be a field replaceable unit (FRU) installed or otherwise coupled to the express node 18. Each express node 18 may include at least one first express ASE card 150-1 configured as a C-Band express ASE card and one first express ASE card 150-1 configured as an L-Band express ASE card. The first express ASE card 150-1, while performing the step of injecting light from the ASE source 162 into the ROADM express input port(s) (step 122), fully monitors the optical signal received via the first MPO connector 166 for each degree and pre-shapes light from the ASE source 162 via the ASE WSS 157 to compensate for an optical loss of signal for each degree. The ASE source 162, as used in the first express ASE card 150-1 may have only one ASE source 162 to support up to five (5) degrees. The ASE WSS 157 is configured to pre-shape the light from the ASE source 162 and provide the pre-shaped ASE light as an output. The ASE wavelength selective switch 157 is a wavelength selective switch having an input port 159 optically connected to the ASE source 162.

In one embodiment, the first express ASE card is in the form of a field replaceable unit (FRU) 164 including a portable housing 166 and one or more first component, such as the express ASE card 150-1, wherein the one or more first component is supported by the portable housing 166. A second component referred to as external to the one or more first component, may be external to the field replaceable unit 164. That is, the second component may be external to the FRU 164, e.g. not supported by the portable housing 166, however, the second component may be in communication with the FRU 164 or any first component therein. If the second component is referred to as being integrated into the one or more first component, the second component may be considered included within the FRU 164 and thus, supported by the portable housing 166.

The first express ASE card 150-1 of FIG. 4 further includes a plurality of degree paths 174 (e.g. optical paths) optically coupled to a first input port 75a of the express optical switch 74 and the first MPO connector 166. An output port 76 of the express optical switch 74 is optically coupled to the second MPO connector 170. Specifically, the first express ASE card 150-1 includes a first degree path 174-1 (e.g., an express path), corresponding to a first degree, optically coupled to the first MPO connector 166 and a first input port 75a (e.g. first input) of a first express optical switch 74-1, the second input port 75b (e.g. second input) is coupled to the waveguide 167, and an output port 76 (e.g. first output) of the first express optical switch 74-1 is optically coupled to the second MPO connector 170; a second degree path 174-2 (e.g., an express path), corresponding to a second degree, optically coupled to the first MPO connector 166 and a first input port 75a (e.g. third input) of a second express optical switch 74-2, the second input port 75b (e.g. fourth input) is coupled to the waveguide 167, and an output port 76 (e.g. second output) of the second express optical switch 74-2 is optically coupled to the second MPO connector 170; a third degree path 174-3, corresponding to a third degree, optically coupled to the first MPO connector 166 and a first input port 75a (e.g. fifth input) of a third express optical switch 74-3, the second input port 75b (e.g. sixth input) coupled to the waveguide 167, and an output port 76 (e.g. third output) of the third express optical 74-3 switch is optically coupled to the second MPO connector 170; and a fourth degree path 174-4, corresponding to a fourth degree, optically coupled to the first MPO connector 166 and a first input port 75a (e.g. seventh input) of a fourth express optical switch 74-4, the second input port 75b (e.g. eighth input) coupled to the waveguide 167, and an output port 76 (e.g. fourth output) of the fourth express optical switch 74-4 is optically coupled to the second MPO connector 170. In one embodiment, the first degree path 174-1, the second degree path 174-2, the third degree path 174-3, and the fourth degree path 174-4 may receive an optical signal from one or more input degree and the second MPO connector 170 may be connected to a downstream wavelength selective switch 172 of a receiving degree wherein the receiving degree is different from any of the one or more input degree. In one embodiment, the second MPO connector 170 may connect output port 76 of the first express optical switch 74-1 (e.g. first output) to a first input port of the downstream wavelength selective switch 172, output port 76 of the second express optical switch 74-2 (e.g. second output) to a second input port of the downstream wavelength selective switch 172, output port 76 of the third express optical switch 74-3 (e.g. third output) to a third input port of the downstream wavelength selective switch 172, and output port 76 of the fourth express optical switch 74-4 (e.g. fourth output) to a fourth input port of the downstream wavelength selective switch 172.

The express ASE card 150 also includes a first OCM 154-1 with an input port 155 configured to monitor output from the ASE WSS 157 via first optical switch 161-1 and a second OCM 154-2 with an input port 155 configured to monitor input, e.g. an optical signal, for each degree path 174-1 through 174-4 via a second optical switch 161-2. The optical switch 161-1 includes a plurality of input ports 163, to receive the output from the ASE WSS 157 and an output port 165 to connect a selected input port 163 to the input port 155 of the OCM 154-1. The second optical switch 161-2 includes a plurality of input ports 163, to receive the optical signal from each degree path 174-1 through 174-4 and an output port 165 to connect a selected input port 163 to the input port 155 of the OCM 154-2.

The second OCM 154-2 detects a spectra of each degree path 174-1 through 174-4 through communication with the one or more photodiode 178 monitoring each degree path. The ASE WSS 157 shapes the light provided by the ASE source 162 to match the spectra detected by the second OCM 154-2 resulting in a pre-shaped ASE light. In one embodiment, the second OCM 154-2 is in communication with one or more photodiode 178. Each photodiode 178 is configured to monitor a degree path for incoming traffic and/or measure a power of an optical signal on a degree path and detect a failure. In one embodiment, the failure may be an optical loss of signal determined based at least in part on a power measured by the photodiode 178 compared to a power threshold. In one embodiment, the power threshold is configurable, that is, the power threshold may be set by a user. The first OCM 154-1 in communication with one or more photodiode 178 monitoring the ASE path, e.g. waveguide, and disposed between the second input port 75b of each express optical switch 74 and the ASE source 162, measures and controls the shape of the ASE light in a closed loop with the ASE WSS 157. When light along a particular degree path 174 is lost, a photodiode 178 on that particular degree path 174 detects the loss of light and triggers the optical switch 74 connected to that particular degree path 174 to send the pre-shaped ASE light to the second MPO connector 170 and on to an express input port of a downstream wavelength selective switch of a downstream ROADM. In one embodiment, the first express ASE card 150-1 may include an ASE port 182 which may provide controlled ASE loading at a downstream ROADM ADD port. By supplying light from the ASE source 162 via ASE port 182 to use with ADD traffic at the degree, fixed spectral loading during controlled addition and removal of optical signals is maintained, including during restoration of an optical signal.

In one embodiment, the express ASE card 150 may signal the optical loss of signal (or failed traffic) to at least one downstream node, either express node 18 or terminal node 14, indicate that light from the ASE source 162 has been inserted, and indicate, to downstream nodes, a location of the optical loss of signal, or some combination thereof. By indicating the optical loss of signal to at least one downstream node, via either in-band or out-of-band information, downstream nodes are prevented from switching from the degree path 174 to light from the ASE source 162 at each node.

Figure 5:
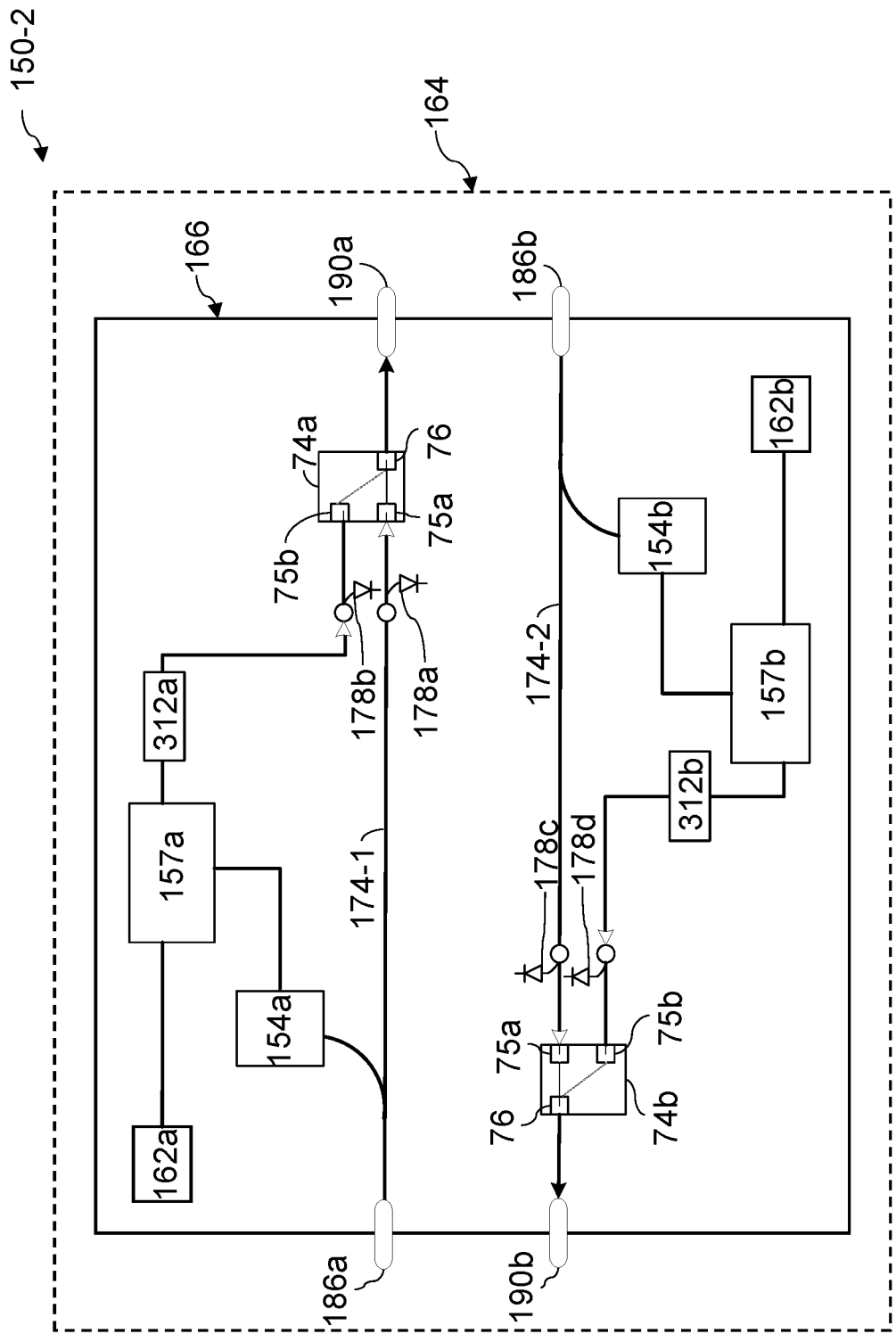
FIG. 5 is a block diagram of an exemplary embodiment of a second express ASE card optimized for two degrees with integrated optical channel monitors and a pre-shaping ASE WSS constructed in accordance with the present disclosure.

Referring now to FIG. 5, shown therein is an exemplary embodiment of a diagram of the second express ASE card 150-2 optimized for two directions with a first degree in a first direction along a first degree path 174-1 and a second degree in a second direction along a second degree path 174-2, the first direction different from the second direction. The first direction includes a first OCM 154a, a first ASE wavelength selective switch (ASE WSS) 157a, a first ASE source 162a providing a first ASE light with a power and an optical spectrum, a first photodiode 178a, a second photodiode 178b, and a first express optical switch 74a with a first input 75a, a second input 75b, and an output 76, and originates at a first fiber input port 186a and terminates at a first fiber output port 190a. The second direction includes a second OCM 154a, a second ASE wavelength selective switch (ASE WSS) 157b, a second ASE source 162a providing a second ASE light with a power and an optical spectrum, a third photodiode 178c, a fourth photodiode 178d, and a second express optical switch 74a with a first input 75a, a second input 75b, and an output 76, and originates at a second fiber input port 186b and terminates at a second fiber output port 190b.

The second express ASE card 150-2 may be a field replaceable unit (FRU) installed or otherwise coupled to the express node 18 including the portable housing 166 supporting the components of the second express ASE card 150-2. Each express node 18 includes at least a C-Band express ASE card 150-2 coupled between C-Band ROADMs and an L-Band express ASE card 150-2 coupled between L-Band ROADMS. A first fiber input port 186a may be connected to an express output port of a first ROADM o and a first fiber output port 190a may be connected to an express input port of a first downstream wavelength selective switch of a second ROADM. A second fiber input port 186b may be connected to an express output port of the second ROADM and a second fiber output port 190b may be connected to an express input port of a second downstream wavelength selective switch of the first ROADM.

For each degree path 174, the OCM 154 monitors the optical signal entering the second express ASE card 150-2 via the fiber input port 186 and is in communication with the ASE WSS 157 causing the ASE WSS 157 to pre-shape the optical spectrum of the ASE light from the ASE source 162. The express optical switch 74 is toggled to supply the pre-shaped ASE light from the ASE source 162 to the fiber output port 190 if an optical loss of signal is detected by the one or more photodiode 178. In one embodiment, the OCM 154 further monitors the optical spectrum of the ASE light pre-shaped by the ASE WSS 157.

In one embodiment the second express ASE card 150-2 is a C-Band express ASE card 150-2, each fiber input port 186a and 186b may be connected to the C-Band express output port of a first C-Band ROADM and each fiber output port 190a and 190b may be connected to the C-Band express input port of a second C-Band ROADM.

In one embodiment the second express ASE card 150-2 is an L-Band express ASE card 150-2, each fiber input port 186a and 186b may be connected to the L-Band express output port of a first L-Band ROADM and each fiber output port 190a and 190b may be connected to the L-Band express input port of a second L-Band ROADM.

In one embodiment, the second express ASE card 150-2, while performing the step of detecting an optical loss of signal in the express path (step 118), monitors, by the first photodiode 178a, the first optical signal received at the first fiber input port 186a and pre-shapes the first ASE light from the first ASE source 162a via the first ASE WSS 157a to compensate for an optical loss of signal for the first degree 174-1. The first ASE WSS 157a is configured to pre-shape the first ASE light from the first ASE source 162a and provide the pre-shaped first ASE light from the first ASE source 162a to the first express optical switch 74a. The second express ASE card 150-2, also while performing the step of detecting an optical loss of signal in the express path (step 118), monitors, by the third photodiode 178c, the second optical signal received at the second fiber input port 186b and pre-shapes the second ASE light from the second ASE source 162b via a second ASE WSS 157b to compensate for an optical loss of signal for the second degree 174-2. The second ASE WSS 157b is configured to pre-shape the second ASE light from the second ASE source 162b and provide the pre-shaped second ASE light from the second ASE source 162b to the second express optical switch 74b.

In one embodiment, the second express ASE card 150-2, while performing the step of injecting ASE light from the ASE source 162 into one or more ROADM express input ports (step 122), has the first photodiode 178a output a first switch signal to the first express optical switch 74a to cause the first express optical switch 74a to connect the second input port 75b of the first express optical switch 74a (e.g. second input) to the output port 76 of the first express optical switch 74a (e.g. first output) instead of connecting the first input port 75a of the first express optical switch 74a (e.g. first input) to the output port 76 of the first express optical switch 74a (e.g. first output), thus switching from supplying the first optical signal to supplying the pre-shaped first ASE light from the first ASE source 162a to the first fiber output port 190a and has the third photodiode 178b output a second switch signal to the second express optical switch 74b to cause the second express optical switch 74b to connect the second input port 75b of the second express optical switch 74b (e.g. fourth input) to the output port 76 of the second express optical switch 74b (e.g. second output) instead of connecting the first input port 75a of the second express optical switch 74b (e.g. third input) to the output port 76 of the second express optical switch 74b (e.g. second output), thus switching from supplying the second optical signal to supplying the pre-shaped second ASE light from the second ASE source 162b to the second fiber output port 190b. The output port 76 of the first express optical switch 74a may be connected to a first input port of a first downstream WSS 172a (not shown) via the first fiber output port 190a, thus, the first ASE light is directed to the first input port of the first downstream WSS 172a. The output port 76 of the second express optical switch 74b may be connected to a second input port of a second downstream WSS 172b (not shown) via the second fiber output port 190b, thus, the second ASE light is directed to the second input port of the second downstream WSS 172b.

In one embodiment, the second express ASE card 150-2 includes a first variable optical attenuator (VOA) 312a disposed between the first ASE WSS 157a and the second photodiode 178b and a second variable optical attenuator (VOA) 312b disposed between the second ASE WSS 157b and the fourth photodiode 178d. The first VOA 312a may be controlled by the second photodiode 178b and the first VOA 312b may be controlled by the fourth photodiode 178d. By controlling the first VOA 312a, the second photodiode 178b may affect the power of the first ASE light from the first ASE source 162a such that the power matches, or is within a power threshold of, a loss in power due to a failure of the first optical signal, e.g. an optical loss of signal. Similarly, by controlling the second VOA 312b, the fourth photodiode 178d may affect the power of the second ASE light from the second ASE source 162b such that the power matches, or is within a power threshold of, a loss in power due to a failure of the second optical signal, e.g. an optical loss of signal. In one embodiment, the power threshold may be any power of ASE light that, when injected into an optical signal, will prevent non-failed, existing channels from failing due to the power transient of the failed channel.

In one embodiment, the first ASE source 162a and the second ASE source 162b are the same ASE source 162. In one embodiment, the ASE source 162 may be integrated into the second express ASE card 150-2. In another embodiment, the ASE source 162 may be located in another component of the express node 18 and shared among more than one express path by splitting the ASE light from the ASE source 162 with a passive coupler into multiple directions. In yet another embodiment, the ASE source 162 may be integrated into the second express ASE card 150-2 and shared between both degrees, that is, a single ASE source 162 may supply an ASE light to the ASE switch 74 in both the first degree path 174-1 and the second degree path 174-2.

In one embodiment, the second express ASE card 150-2 is arranged such that the second express ASE card 150-2 omits the first OCM 154a, the second OCM 154b, the first ASE WSS 157a, and the second ASE WSS 157b thereby causing the first ASE source 162a to be connected directly to the second input port 75b of the first express optical switch 74a, and the second ASE source 162b to be connected directly to the second input port 75b of the second express optical switch 74a; however, in such an arrangement, the first ASE light generated by the first ASE source 162a and the second ASE light generated by the second ASE source 162b are no longer pre-shaped before being injected into the ROADM express input port in step 122. In such an embodiment, the first downstream WSS 172a within a downstream ROADM may filter and shape the ASE light and, the second downstream WSS 172b within a downstream ROADM may filter and shape the second ASE light, however, such an embodiment would likely result in higher optical crosstalk, or interference between signal channels. The optical crosstalk may not significantly degrade optical signal performance in a particular implementation of this embodiment. In one embodiment, the first ASE source 162a and/or the second ASE source 162b may be integrated into the second express ASE card 150-2, or the first ASE source 162a and/or the second ASE source 162b may be located in another component of the express node 18 as detailed above. In one embodiment, the first ASE source 162a and the second ASE source 162b are the same ASE source 162.

In one embodiment, a first optical signal enters the second express ASE card 150-2 at first fiber input port 186a and is carried on the first degree path 174-1 (e.g. first optical path). The first optical signal is monitored and/or measured by a first photodiode 178a before entering a first input port 75a of a first express optical switch 74a (e.g. first input). A first ASE source 162a may supply an ASE light having a power and an optical spectrum to a first input port of a first ASE wavelength selective switch 157a. The first ASE wavelength selective switch 157a may shape the power and/or optical spectrum of the first ASE light to the power and/or optical spectrum measured by the first photodiode 178a. The ASE light is monitored by a second photodiode 178b and continues to a second input port 75b of the first express optical switch 74a (e.g. second input). The first photodiode 178a detects a failure of the first optical signal. For example, the first photodiode 178a may detect a power of the first optical signal and compare the power to a power threshold to determine whether there is an optical loss of signal. If the first photodiode 178a detects the failure, the first photodiode 178a may cause the first express optical switch 74a to switch from optically coupling the first input port 75a (e.g. first input) to a first output port 76 (e.g. first output) to optically coupling the second input port 75b (e.g. second input) to the first output port 76 (e.g. first output), thereby causing the ASE light to be supplied to the first fiber output port 190a thus supplying the ASE light to a first downstream wavelength selective switch of a downstream ROADM.

In one embodiment, a second optical signal enters the second express ASE card 150-2 at second fiber input port 186b and is carried on the second degree path 174-2 (e.g. second optical path). The second optical signal is monitored and/or measured by a third photodiode 178c before entering a first input port 75a of a second express optical switch 74b (e.g. third input). A second ASE source 162b may supply a second ASE light having a power and an optical spectrum to a first input port of a second ASE wavelength selective switch 157b. The second ASE selective switch 157b may shape the power and/or optical spectrum of the second ASE light to the power and/or optical spectrum measured by the third photodiode 178c. The second ASE light is monitored by a fourth photodiode 178d and continues to a second input port 75b of the second express optical switch 74b (e.g. fourth input). The third photodiode 178c detects a failure of the second optical signal. For example, the third photodiode 178c may detect a power of the second optical signal and compare the power to a power threshold to determine whether there is an optical loss of signal. If the third photodiode 178c detects the failure, the third photodiode 178c may cause the second express optical switch 74b to switch from optically coupling the first input port 75a (e.g. third input) to a first output port 76 of the second express optical switch 74b (e.g. second output) to optically coupling the second input port 75b (e.g. fourth input) to the first output port 76 of the second express optical switch 74b (e.g. second output), thereby causing the second ASE light to be supplied to the second fiber output port 190b thus supplying the second ASE light to a second downstream wavelength selective switch of a second downstream ROADM.

Figure 6:
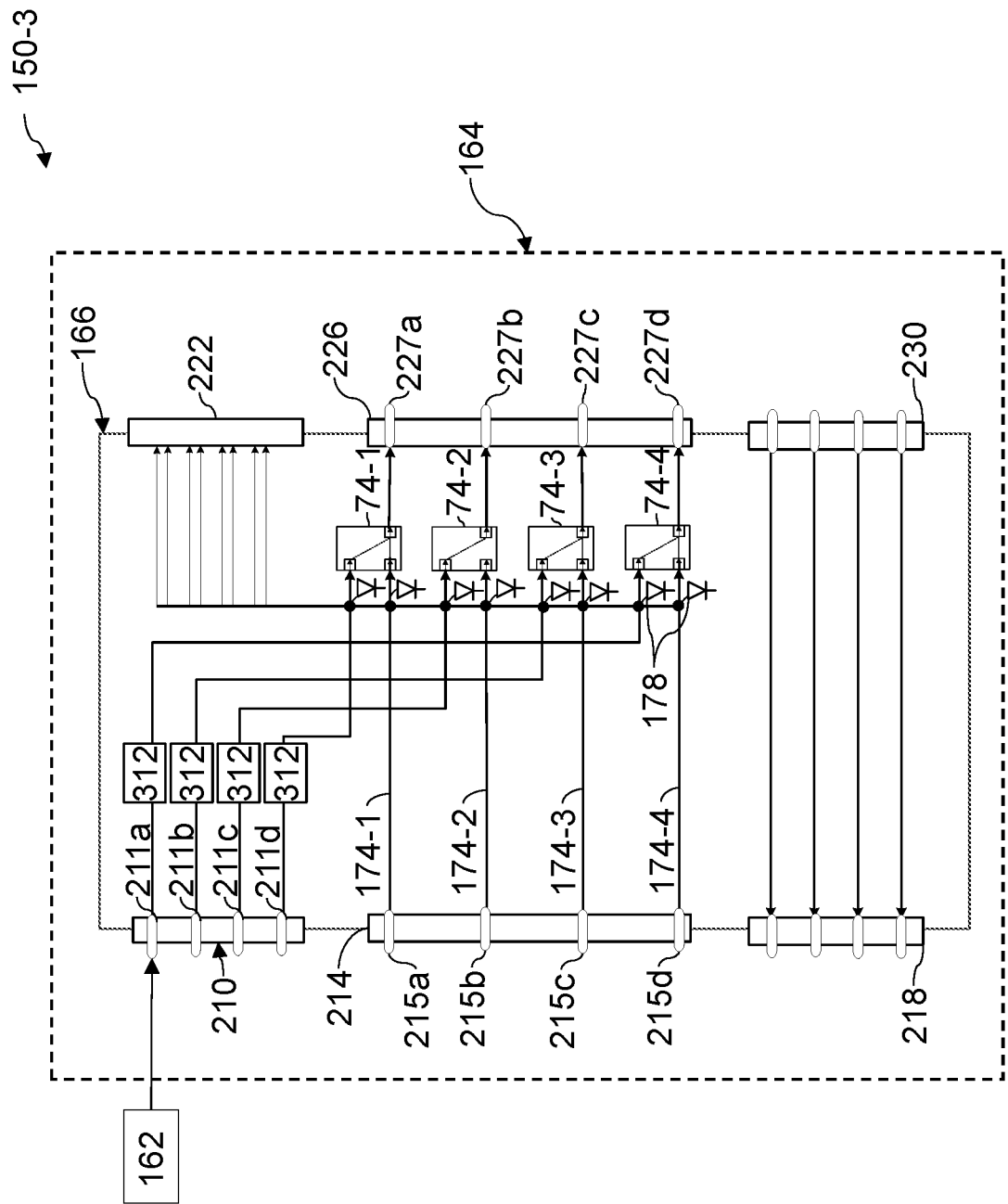
FIG. 6 is a block diagram of an exemplary embodiment of a third express ASE card implemented as an ASE switch card with external ASE sources and no pre-shaping ASE WSS constructed in accordance with the present disclosure.

Referring now to FIG. 6, shown therein is an exemplary embodiment of the third express ASE card 150-3 configured as an ASE switch card. The third express ASE card 150-3 has a plurality of connections including an ASE input connection 210, express input connection 214, an express output connection 218, a signal monitor connection 222, an express ADD connection 226, and an express DROP connection 230, one or more photodiode 178 for each degree, and an express optical switch 74 for each degree having a first input port, a second input port and an output port (not labeled for simplicity in FIG. 5). Each of the connections 210-230 may include one or more port on the third express ASE card 150-3. For example, the express input connection 214 may include a plurality of ports 215a-d, each port 215a-d corresponding to a particular degree, and the express ADD connection 226 may include a plurality of ports 227a-d, each port 227a-d associated with the same degree. The third express ASE card 150-3 when used in the express node 18 may be connected to at least one ROADM and at least one other third express ASE card 150-3. As shown, the third express ASE card 150-3, in comparison to the first express ASE card 150-1 and the second express ASE card 150-2, does not include an ASE WSS 157, thereby resulting in no pre-shaping of the ASE light generated by the ASE source 162. In one embodiment, the third express ASE card 150-3 may be a field replaceable unit (FRU) installed or otherwise coupled to the express node 18.

In one embodiment, the ASE input connection 210 is connected to one or more ASE source 162, each ASE source 162 providing an ASE light having a power and an optical spectrum. Each ASE source 162 may be external to the third express ASE card 150-3, or may be integrated into the third express ASE card 150-3. The ASE input connection 210 may have a plurality of ports 211a-d, each port 211a-d configured to receive ASE light from the one or more ASE source 162 (e.g. a first ASE source and a second ASE source) for a particular degree and, via an ASE waveguide, connect ASE light from the one or more ASE source 162 to the express optical switch 74-1 through 74-4 corresponding to the particular degree.

In one embodiment, the express input connection 214, optically configured to receive a connection from the express output connection 218 of an upstream express ASE card 150-3, enables a connection for a first degree on a first degree path 174-1 to connect to a first express optical switch 74-1; a connection for a second degree on a second degree path 174-2 to connect to a second express optical switch 74-2; a connection for a third degree on a third degree path 174-3 to connect to a third express optical switch 74-3; and a connection for a fourth degree on a fourth degree path 174-4 to connect to a fourth express optical switch 74-4.

In one embodiment, an array of photodiodes 178, including at least one photodiode 178 for each degree path 174, such as degree paths 174-1 through 174-4, monitors each degree path 174 for an optical loss of signal. When a particular photodiode 178 monitoring a particular degree path 174 detects an optical loss of signal, the particular photodiode 178 will trigger a particular express optical switch 74 connected to the particular degree path 174 to switch from transmitting the optical signal on the particular degree path 174 to a particular express ADD port 227 on the express ADD connection 226 corresponding to the particular degree path 174 to transmitting the ASE source 162 connected to the particular express optical switch 74 to the particular express ADD port 227 on the express ADD connection 226. Additionally, the array of photodiodes 178 may enable communication with one or more component of the express node 18 via the signal monitor connection 222. In another embodiment, the array of photodiodes 178 may further be associated with and monitor each ASE source 162 connected to each express optical switch 74.

In one embodiment, the express ASE card 150-3 includes the express DROP connection 230 configured to receive an optical signal from a ROADM and pass that optical signal through the express ASE card 150-3 to the express output connection 218, which is configured to be in optical communication with a downstream express ASE card 150-3.

In one embodiment, the express ASE card 150-3 includes a variable optical attenuator (VOA) 312 disposed between each ASE input port 211 and photodiode 178 along the ASE optical path. The VOA 312 associated with a particular ASE input port 211 may be controlled by the photodiode 178 associated with the particular ASE input port 211. By controlling the VOA 312 associated with the particular ASE input port 211, the photodiode 178 may affect the power of the ASE light from the particular ASE source 162 such that the power matches, or is within a threshold power window of, a loss in power due to a failure, e.g. an optical loss of signal. The threshold power window may be any power of the ASE light that, when injected into the optical signal, will prevent non-failed, existing channels from failing due to the power transient of the failed channel.

Referring now to FIG. 7, shown therein is a block diagram of an exemplary embodiment of the express node 18. The express node 18 generally includes a first fiber optic cable 42a carrying a first optical signal in a first direction, a second fiber optic cable 42b carrying a second optical signal in a second direction, a first C-Band ROADM 250a, a second C-Band ROADM 250b, a first L-Band ROADM 254a, a second L-Band ROADM 254b, and a plurality of express ASE cards 150-3 depicted as ASE switch cards 256a-d. In FIG. 7, for simplicity only one degree for both the first direction and the second direction is shown, however, there may be more than one degree in each direction. Additionally, each ROADM 250a, 250b, 254a, and 254b is depicted connected to one express ASE card 150-3, however, each ROADM 250a, 250b, 254a, and 254b may be connected to more than one express ASE card 150-3.

The first optical signal traveling in the first direction along the first fiber optic cable 42a enters the first C-Band ROADM 250a and enters a diverter 258 where an L-Band of the first optical signal is diverted to the first L-Band ROADM 254a while a C-Band of the first optical signal is amplified by amplifier 262a and enters a first upstream wavelength selective switch 158a that separates out a portion of the C-Band (C-Band portion) being expressed to the second C-Band ROADM 250b. The C-Band portion continues to an express DROP connection 230 of a first ASE switch card 256a, passes through an express output connection 218 of the first ASE switch card 256a, and continues to an express input connection 214 of a second ASE switch card 256b where the C-Band Portion is monitored by a photodiode 178 and enters an express optical switch 74 having a first input port, a second input port and an output port (not labeled for brevity). When the photodiode 178 monitoring the C-Band portion identifies an optical loss of signal, the photodiode 178 triggers the express optical switch 74 to switch from transmitting the C-Band portion of the first optical signal to an express ADD connection 226 to transmitting ASE light from a C-Band ASE source 162-1 as the C-Band portion to the express ADD connection 226. Once the ASE light having the C-Band Portion passes through the express optical switch 74, such ASE light continues to an express ADD connection 226 of the second ASE switch card 256b and is then routed to a first input port of a first downstream wavelength selective switch 172a of the second C-Band ROADM 250b, is amplified by a second amplifier 262b of the second C-Band ROADM 250b and enters a combiner 268. The L-Band of the first optical signal enters the first L-Band ROADM 254a, is amplified by first amplifier 262a and enters a second upstream wavelength selective switch 158b that separates out a portion of the L-Band (L-Band portion) being expressed to the second C-Band ROADM 250b. The L-Band portion continues to an express DROP connection 230 of a third ASE switch card 256c, passes through an express output connection 218 of the third ASE switch card 256c, and continues to an express input connection 214 of a fourth ASE switch card 256d where the L-Band portion of the first optical signal is monitored by the photodiode 178 and enters the express optical switch 74. When the photodiode 178 monitoring the L-Band portion identifies an optical loss of signal, the photodiode 178 triggers the express optical switch 74 to switch from transmitting the L-Band portion of the first optical signal to an express ADD connection 226 to transmitting ASE light from an L-Band ASE source 162-2 as ASE light having the L-Band portion to the express ADD connection 226. Once the L-Band Portion passes through the express optical switch 74, such ASE light continues to an express ADD connection 226 of the fourth ASE switch card 256d and is then routed to a second input port of a second downstream wavelength selective switch 172b of the second L-Band ROADM 254b, is amplified by a second amplifier 262b of the second L-Band ROADM 254b and continues to the second C-Band ROADM 250b where the L-Band portion enters the combiner 268. At the combiner 268, the C-Band portion and the L-Band portion are combined into the first optical signal and are transmitted along the first fiber optic cable 42a.

The second optical signal traveling in the second direction along the second fiber optic cable 42b enters the second C-Band ROADM 250b and enters the diverter 258 where an L-Band of the second optical signal is diverted to the second L-Band ROADM 254b while a C-Band of the second optical signal is amplified by first amplifier 262a and enters the third upstream wavelength selective switch 158c that separates out a portion of the C-Band (C-Band portion) being expressed to the first C-Band ROADM 250a. The C-Band portion continues to an express DROP connection 230 of the second ASE switch card 256b, passes through an express output connection 218 of the second ASE switch card 256b, and continues to an express input connection 214 of the first ASE switch card 256a where the C-Band Portion is monitored by a photodiode 178 and enters an express optical switch 74. When the photodiode 178 monitoring the C-Band portion identifies an optical loss of signal, the photodiode 178 triggers the express optical switch 74 to switch from transmitting the C-Band portion of the second optical signal to an express ADD connection 226 to transmitting ASE light from a C-Band ASE source 162-1 as the C-Band portion to the express ADD connection 226. Once the C-Band Portion passes through the express optical switch 74, such C-Band Portion continues to an express ADD connection 226 of the first ASE switch card 256a and is then routed to a third input port of a third downstream wavelength selective switch 172c of the first C-Band ROADM 250a, is amplified by a second amplifier 262b of the first C-Band ROADM 250a and enters the combiner 268. The L-Band of the second optical signal enters the second L-Band ROADM 254b, is amplified by first amplifier 262a and enters the fourth upstream wavelength selective switch 158d that separates out a portion of the L-Band (L-Band portion) being expressed to the first C-Band ROADM 250a. The L-Band portion continues to an express DROP connection 230 of the fourth ASE switch card 256d, passes through an express output connection 218 of the fourth ASE switch card 256d, and continues to an express input connection 214 of the third ASE switch card 256c where the L-Band portion of the first optical signal is monitored by a photodiode 178 and enters an express optical switch 74. When the photodiode 178 monitoring the L-Band portion identifies an optical loss of signal, the photodiode 178 triggers the express optical switch 74 to switch from transmitting the L-Band portion of the second optical signal to an express ADD connection 226 to transmitting ASE light generated by an L-Band ASE source 162-2 as the L-Band portion to the express ADD connection 226. Once the L-Band Portion passes through the express optical switch 74, the L-Band Portion continues to an express ADD connection 226 of the third ASE switch card 256c and is then routed to a fourth input port of a fourth downstream wavelength selective switch 172d of the first L-Band ROADM 254a, is amplified by a second amplifier 262b of the first L-Band ROADM 254a and continues to the first C-Band ROADM 250a where the L-Band portion enters the combiner 268. At the combiner 268, the C-Band portion and the L-Band portion are combined into the second optical signal and are transmitted along the second fiber optic cable 42b.

Each ROADM 250a, 250b, 254a, and 254b may include an optical supervisory channel 272 configured to enable communication between one or more ROADM and/or one or more node, either express node 18 or terminal node 14, within the optical network 10.

Shown in FIG. 8 is an exemplary ASE light source 162. The ASE light source 162 may be composed of an amplifying rare-earth doped optical fiber 300, such as Er-doped fiber, a pumping Source 304, an optical isolator 308, and a variable optical attenuator 312. In this ASE light source 162, erbium ions doped in the amplifying optical fiber 300 are excited into a high energy level by pumping the light from the pumping Source 304, and then, emitting ASE light in the wavelength band individual to the ion when the excited energy higher than the ground level is emitted. The isolator 308 prevents the ion excitation in the amplifying rare-earth doped optical fiber 300 from being made unstable by the returning light from the output end of the fiber. The variable optical attenuator 312 may be used to reduce and/or otherwise adjust a power of the ASE light. In one embodiment, the power of the ASE light may be monitored by a photodiode 178, which, in communication with the ASE light source 162, may cause the variable optical attenuator 312 to adjust the power to match, or be within a threshold power window of, a loss in power due to an optical loss of signal.

While the emitted ASE light from Er-doped amplifying fiber amplifier typically includes a wavelength band of 1530 to 1570 nm (1550 nm band), the fiber can emit a wavelength band of 1570 to 1610 nm as the fiber length is elongated 4 to 6 times as long as the usual fiber length. See Ono et al; "Amplifying Characteristics of 1.58 um Band Er"-Doped Optical Fibers Amplifier", Technical Report of Institute Of Electronics, Information and Communication Engineers, Japan, No. 5, pp. 25-29, 1997. In addition, 36 nm of a half-width of the ASE light has been achieved by a quartz Er-doped fiber (in a range of 1567 to 1604 nm), and 40 nm (1563 to 1603 nm) by a fluoride Er-doped fiber.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. An apparatus, comprising:
   A downstream wavelength selective switch having an input port;
   an optical path operable to carry an optical signal;
   an optical source providing amplified spontaneous emission (ASE) operable to provide ASE light;
   an optical switch having a first input coupled to the optical path, a second input coupled to the optical source and receiving the ASE light, and an output coupled to the input port of the downstream wavelength selective switch, wherein the optical switch couples either the first input or the second input to the output; and
   a photodiode operable to monitor the optical signal, detect an optical loss of signal of the optical signal, and output a switch signal to the optical switch such that the optical switch couples the second input receiving the ASE light to the output whereby the ASE light is directed to the input port of the downstream wavelength selective switch,
   wherein the input port is a first input port, the optical path is a first optical path, the optical signal is a first optical signal, the optical switch is a first optical switch, and the photodiode is a first photodiode, and further comprising:
   the downstream wavelength selective switch having a second input port;
   a second optical path operable to carry a second optical signal;
   a second optical switch having a third input connected to the second optical path, a fourth input connected to the optical source and receiving ASE light from the optical source, and a second output connected to the second input port of the downstream wavelength selective switch, wherein the second optical switch connects either the third input or the fourth input to the second output; and
   a second photodiode operable to monitor the second optical signal, detect an optical loss of signal of the second optical signal, and output a second switch signal to cause the second optical switch to connect the fourth input receiving ASE light from the optical source to the second output thereby supplying ASE light from the optical source to the second input port of the downstream wavelength selective switch.

2. The apparatus of claim 1, further comprising an ASE wavelength selective switch optically disposed between the optical source and the second input, and an optical channel monitor including the second photodiode, the optical channel monitor being operable to monitor an optical spectrum of the optical signal and cause the ASE wavelength selective switch to shape the ASE light from the optical source to conform to the optical spectrum of the optical signal.

3. The apparatus of claim 1, wherein the amplified spontaneous emission (ASE) source operable to provide ASE light is a first optical source operable to provide a first ASE light, further comprising a second amplified spontaneous emission (ASE) source operable to provide a second ASE light, and wherein the fourth input is connected to the second optical source and receiving the second ASE light from the second optical source, and the second switch signal causes the second optical switch to connect the fourth input receiving the second ASE light from the second optical source to the second output.

4. The apparatus of claim 3, further comprising an ASE wavelength selective switch optically disposed between the second optical source and the fourth input, and an optical channel monitor operable to monitor an optical spectrum of the optical signal and cause the ASE wavelength selective switch to shape the ASE light from the optical source to conform to the optical spectrum of the second optical signal.

5. The apparatus of claim 1, further comprising a third photodiode operable to monitor a power of the ASE light entering the second input.

6. The apparatus of claim 1, further comprising a third photodiode operable to monitor a power of the ASE light entering the fourth input.

7. The apparatus of claim 1, further comprising a variable optical attenuator optically disposed between the optical source and the second input, the variable optical attenuator, in communication with the third photodiode, adjusts the power of the ASE light entering the second input.

8. The apparatus of claim 6, further comprising a variable optical attenuator optically disposed between the optical source and the fourth input, the variable optical attenuator, in communication with the third photodiode, adjusts the power of the ASE light entering the fourth input.

9. An apparatus, comprising:
an upstream wavelength selective switch having an output port;
a downstream wavelength selective switch having an input port;
an optical path operable to carry an optical signal from the output port of the upstream wavelength selective switch;
an optical source operable to generate amplified spontaneous emission (ASE) light;
an optical switch having a first input connected to the optical path, a second input connected to the optical source and receiving ASE light from the optical source, and an output connected to the input port of the downstream wavelength selective switch, wherein the optical switch connects either the first input or the second input to the output; and
a photodiode operable to monitor the optical signal, detect an optical loss of signal of the optical signal, and output a switch signal to cause the optical switch to connect the second input receiving ASE light from the optical source to the output causing ASE light from the optical source to be directed to the input port of the downstream wavelength selective switch
wherein the input port is a first input port, the optical path is a first optical path, the optical signal is a first optical signal, the optical switch is a first optical switch, and the photodiode is a first photodiode, and further comprising:
the downstream wavelength selective switch having a second input port;
a second optical path operable to carry a second optical signal;
a second optical switch having a third input connected to the second optical path, a fourth input connected to the optical source and receiving ASE light from the optical source, and a second output connected to the second input port of the downstream wavelength selective switch, wherein the second optical switch connects either the third input or the fourth input to the second output; and
a second photodiode operable to monitor the second optical signal, detect an optical loss of signal of the second optical signal, and output a second switch signal to cause the second optical switch to connect the fourth input receiving ASE light from the optical source to the second output thereby supplying ASE light from the optical source to the second input port of the downstream wavelength selective switch.

10. The apparatus of claim 9, further comprising an ASE wavelength selective switch optically disposed between the optical source and the second input, and an optical channel monitor operable to monitor an optical spectrum of the optical signal and, in communication with the ASE wavelength selective switch, cause the ASE wavelength selective switch to shape the ASE light from the optical source to conform to the optical spectrum of the optical signal.

11. The apparatus of claim 9, wherein the amplified spontaneous emission (ASE) source operable to generate ASE light is a first optical source operable to generate a first ASE light, further comprising a second amplified spontaneous emission (ASE) source operable to generate a second ASE light, and wherein the fourth input is connected to the second optical source and receiving the second ASE light from the second optical source, and the second switch signal causes the second optical switch to connect the fourth input receiving the second ASE light from the second ASE source to the second output.

12. The apparatus of claim 11, further comprising a second ASE wavelength selective switch optically disposed between the second optical source and the fourth input, and an optical channel monitor operable to monitor an optical spectrum of the optical signal and, in communication with the second ASE wavelength selective switch, cause the second ASE wavelength selective switch to shape the ASE light from the optical source to conform to the optical spectrum of the optical signal.

13. The apparatus of claim 9, further comprising a third photodiode operable to monitor a power of the ASE light entering the second input.

14. The apparatus of claim 9, further comprising a third photodiode operable to monitor a power of the ASE light entering the fourth input.

15. The apparatus of claim 13, further comprising a variable optical attenuator optically disposed between the optical source and the second input, the variable optical attenuator, in communication with the third photodiode, adjusts the power of the ASE light entering the second input.

16. The apparatus of claim 14, further comprising a variable optical attenuator optically disposed between the optical source and the fourth input, the variable optical attenuator, in communication with the third photodiode, adjusts the power of the ASE light entering the fourth input.

\* \* \* \* \*